United States Patent [19]

Shih et al.

[11] Patent Number: 5,284,577
[45] Date of Patent: Feb. 8, 1994

[54] DEMETALIZATION PROCESS UTILIZING A CATALYST COMPRISING A NON-PILLARED, DELAMINATED LAYERED SILICATE

[75] Inventors: Stuart S. Shih, Cherry Hill, N.J.; James C. Vartuli, West Chester, Pa.

[73] Assignee: Mobil Oil Corp., Fairfax, Va.

[21] Appl. No.: 20,953

[22] Filed: Feb. 22, 1993

Related U.S. Application Data

[60] Division of Ser. No. 848,597, Mar. 9, 1992, Pat. No. 5,236,882, which is a continuation-in-part of Ser. No. 644,149, Jan. 22, 1991, Pat. No. 5,137,861.

[51] Int. Cl.$^5$ ............................................. C10G 45/04
[52] U.S. Cl. ............................ 208/251 H; 208/251 R
[58] Field of Search ........................ 208/251 H, 251 R

[56] References Cited

U.S. PATENT DOCUMENTS

| | | | |
|---|---|---|---|
| 4,600,503 | 7/1986 | Angevine et al. | 208/251 H |
| 4,701,435 | 10/1987 | Garcia et al. | 502/252 |
| 4,812,228 | 3/1989 | Angevine | 208/251 H |
| 4,859,648 | 8/1989 | Landis et al. | 502/242 |
| 4,937,222 | 6/1990 | Angevine et al. | 502/242 |
| 5,015,360 | 5/1991 | Degnan et al. | 208/110 |
| 5,068,216 | 11/1991 | Johnson et al. | 502/241 |

*Primary Examiner*—Mark L. Bell
*Assistant Examiner*—Walter D. Griffin
*Attorney, Agent, or Firm*—Alexander J. McKillop; Dennis P. Santini; Edward F. Kenehan, Jr.

[57] ABSTRACT

There is provided a catalyst comprising at least one hydrogenation metal, such as Ni and Mo, supported on a delaminated layered silicate, such as kenyaite, which has been swollen and calcined. There is also provided a method for making this catalyst. There is further provided a process for using this catalyst to demetalize a petroleum feedstock, such as a gas oil.

6 Claims, No Drawings

DEMETALIZATION PROCESS UTILIZING A CATALYST COMPRISING A NON-PILLARED, DELAMINATED LAYERED SILICATE

CROSS-REFERENCE TO RELATED APPLICATION

This application is a division of copending U.S. application Ser. No. 07/848,597, filed Mar. 9, 1992, now U.S. Pat. No. 5,236,882 which is a continuation-in-part of U.S. application Ser. No. 07/644,149, filed Jan. 22, 1991, now U.S. Pat. No. 5,137,861. The entire disclosures of these applications are expressly incorporated herein by reference.

BACKGROUND

There is provided a catalyst comprising at least one hydrogenation metal, such as Ni and Mo, supported on a delaminated layered silicate, such as kenyaite, which has been swollen and calcined. There is also provided a method for making this catalyst. There is further provided a process for using this catalyst to demetalize a petroleum feedstock, such as a resid.

In general, calcined layered materials, i.e. clays, silicates, and metal oxides, exhibit low surface areas ($<50$ m$^2$/g) and are not attractive as catalysts supports. The activity and surface areas of these materials can be enhanced by swelling and pillaring. In the case of the silicates, i.e. kenyaite and magadiite, the activity enhancement would be a function of the pillaring material used. The improvement in the surface area and porosity would be a function of the extent of swelling and/or pillaring. However, the pore openings (or layered spacings) are limited by the stability of the pillaring agents. In addition, the pillars could cause additional diffusion resistance, depending on the homogeneity of the pillaring process. Some reactions, such as demetallation of heavy hydrocarbons, require very large pore openings ($>50$ Angstroms) to reduce diffusion resistance of the bulky metal-containing molecules. Even larger cylindrical type pores (50–200 Angstroms) can be rapidly deactivated by the building up of deposited metals from the heavy hydrocarbons. Catalysts supports with unique pore shapes (i.e. cone-shaped morphology) that can reduce the pore-mouth plugging are highly desirable. Alumina supports with such desirable pore morphology have been discussed by H. Toulboat et al. in U.S. Pat. Nos. 4,498,972; 4,499,203; 4,501,042; and 4,511,458, as well as "New HDM Catalysts: Design and Performance for Demetallation and Conversion", ACS Div. Petroleum Chemistry, Vol. 30, No. 1, pp. 85–95 (1985). These alumina materials are formed by a rapid calcination of an organic treated amorphous alumina.

SUMMARY

There is provided a catalyst comprising at least one hydrogenation metal supported on a non-pillared, delaminated layered silicate lacking octahedrally coordinated sheets of clays.

There is also provided a method for making a catalyst, said catalyst comprising at least one hydrogenation metal supported on a delaminated layered silicate lacking octahedrally coordinated sheets of clays, said method comprising the steps of:

(i) contacting said layered silicate with a swelling agent under conditions sufficient to incorporate said swelling agent into the interspathic region of said layered silicate and to separate the layers of said layered silicate;

(ii) calcining the swollen layered silicate of step (i) under conditions sufficient to delaminate the layers of said layered silicate; and (iii) combining the layered silicate of step (ii) with at least one hydrogenation metal.

There is further provided a process for demetalizing a petroleum feedstock, said process comprising contacting said petroleum feedstock with a catalyst under sufficient demetallation conditions, said catalyst comprising at least one hydrogenation metal supported on a delaminated layered silicate lacking octahedrally coordinated sheets of clays.

EMBODIMENTS

Low surface area layered silicates (e.g.; unswollen, calcined kenyaite; $<50$ m$^2$/g surface area) can be converted to high surface area supports (150–200 m$^2$/g) by thermally treating the preswollen form. Evaluation of a NiMo impregnated kenyaite after this type of treatment showed good activity for the demetallation of Arabian Light atmospheric resid.

Layered silicates are composed of tetrahedral sheets condensed on each other and lack the octahedral sheets found in clays. Layered silicates are "non-water-swellable" which is intended to distinguish from conventional clays which contain octahedrally coordinated metal oxide sheets bonded to tetrahedrally coordinated silica sheets and which undergo substantial swelling sometimes by an essentially unbounded amount, when contacted with water. As used herein in relation to a layered silica material, the term "non-water-swellable" is defined as meaning a layered silicate material, which, when contacted with at least 10 grams of water per gram of the layered silicate at 23° C. for 24 hours, exhibits an increase in d-spacing no greater than 5 Angstroms as compared with the material before treatment. Included among these materials are the metasilicates. Layered silicates, e.g., high silica alkali silicates such as magadiite, natrosilite, kenyaite, makatite, nekoite, kanemite, okenite, dehayelite, macdonaldite and rhodesite, unlike swellable clays, lack octahedral sheets, i.e., sheets composed of atoms which are octahedrally coordinated with oxygen atoms.

The layered silicates known as high silica alkali silicates whose layers lack octahedral sheets can be prepared hydrothermally from an aqueous reaction mixture containing silica and caustic at relatively moderate temperatures and pressures. These layered silicates may contain tetracoordinate framework atoms other than Si. Such layered silicates can be prepared by co-crystallizing in the presence of non-silicon tetravalent elements, e.g., those selected from the group consisting of Al, B, Cr, Fe, Ga, In, Ni, Zr as well as any other such elements which are catalytically useful when incorporated in the silicate structure. Alternatively, non-silicon framework elements already in a layered silicate may be substituted by a tetracoordinate element. For example, kenyaite containing boron in its framework when treated with aluminum nitrate results in a kenyaite which contains aluminum in its framework. Both co-crystallized and substituted layered high silica alkali silicates may be methods described herein.

Synthetic magadiite is readily synthesized hydrothermally from a reaction mixture containing inexpensive sources of silica and caustic. Tetracoordinate elements other than silicon, e.g., those selected from the group consisting of Al, B, Cr, Fe, Ga, In, Ni, Zr and other catalytically useful metals, may be added to the reaction mixture to produce synthetic magadiite layered silicates. Preferably, such elements are selected from the group consisting of Al and Fe. An organic directing agent may also be added to the reaction mixture. The reaction mixture for synthetic magadiite materials can be described in molar ratios as follows:

| | |
|---|---|
| $SiO_2/X_2O_3 =$ | 10 to infinity where X can be Al, B, Cr, Fe, Ga, and/or Ni or other catalytically useful metal |
| $M^+OH^-/SiO_2 =$ | 0 to 0.6 (preferably 0.1–0.6) M = any alkali metal |
| $H_2O/SiO_2 =$ | 8–500 |
| $R/SiO_2 =$ | 0–0.4 | where R can be an organic such as benzyltriethylammonium chloride, benzyltrimethylammonium chloride, dibenzylmethylammonium chloride, N,N'-dimethylpiperazine, triethylamine, or other quaternary compounds or heterocyclic amines.

The reaction mixture can be maintained at a temperature of about 100° to 200° C. for anywhere from about 1 to 150 days in order to form a product having the following composition:
%  N=0–3, e.g., 0 to 0.3
$SiO_2X_2O_3 = 10$ to infinity
where X may be in the tetrahedral or octahedral position
$M_2O/SiO_2 = 0$ to 5.0, e.g., 0.05–0.1

Kenyaite, a layered silicic acid which is known to exist in nature as a sodium salt $Na_2 Si_{22}O_{45} H_2O$ can be prepared in the potassium form $K_2Si_{22}O_{45}\cdot 10H_2O$ in the laboratory. Synthetic kenyaite is readily synthesized hydrothermally from a reaction mixture containing inexpensive sources of silica and caustic, preferably KOH. Tetracoordinate elements other than silicon, e.g., those selected from the group consisting of Al, B, Cr, Fe, Ga, In, Ni, Zr and other catalytically useful metals, may be added to the reaction mixture to produce synthetic kenyaite. Al $(NO_3)_3\cdot 9H_2O$ and aluminum-tri-sec-butoxide are suitable reagents for the introduction of non-silicon tetracoordinate elements in the kenyaite framework. Co-crystallizing with B, Al, and/or Zr is particularly preferred. The reaction mixture may also be seeded with kenyaite.

It will be understood that the terms, magadiite and kenyaite, as used herein, connote synthetic forms of the naturally occurring substances of the same structure. For example, naturally occurring magadiite has been found in Lake Magadi, Kenya.

The layered silicate may be swollen by methods discussed in U.S. Pat. No. 4,859,648, the entire disclosure of which is expressly incorporated herein be reference.

These layered silicates may be swollen by treatment with a swelling agent. Such swelling agents are materials which cause the layers to separate by becoming incorporated into the interspathic region of these layers. The swelling agents are removable by calcination, preferably in an oxidizing atmosphere, whereby the swelling agent becomes decomposed and/or oxidized.

Suitable swelling agents may comprise a source of organic cation, such as organoammonium cation, in order to effect an exchange of the interspathic cations. Suitable organoammonium cations include cetyltrimethylammonium cations. A pH range of 7–10 may be employed during treatment with the swelling agent.

The foregoing treatment results in the formation of a layered silicate of enhanced interlayer separation depending upon the size of the organic cation introduced. In one embodiment, a series of organic cation exchanges can be carried out. For example, an organic cation may be exchanged with an organic cation of greater size, thus increasing the interlayer separation in a step-wise fashion. Contact of the layered silicate with the swelling agent is conducted in aqueous medium so that water is trapped between the layers of the swollen species.

Insertion of the organic cation between the adjoining layers serves to physically separate the layers. In particular, alkylammonium cations have been found useful. Thus $C_3$ and larger alkylammonium, e.g., cetyltrimethylammonium, cations are readily incorporated with the interlayer spaces of the layered silicate serving to prop open the layers. The extent of the interlayer spacing can be controlled by the size of the organoammonium ion employed.

After calcination to remove the organic propping agent, the delaminated product may contain residual exchangeable cations. Such residual cations in the layered silicate can be ion exchanged by known methods with other cationic species to provide or alter the catalytic activity of the delaminated product. Suitable replacement cations include cesium, cerium, cobalt, nickel, copper, zinc, manganese, platinum, lanthanum, aluminum, ammonium, hydronium and mixtures thereof.

The layered silicates described herein are used in intimate combination with a hydrogenating component such as tungsten, vanadium, molybdenum, rhenium, nickel, cobalt, chromium, manganese, or a noble metal such as platinum or palladium. Particular Groups of the Periodic Table from which the hydrogenation metal may be selected include Group VI (Cr, Mo, W) and Group VIII (Fe, Co, Ni, Ru, Rh, Pd, Os, Ir and Pt). Such component can be exchanged into the composition, impregnated therein or intimately physically admixed therewith. Contacting of the layered silicate with the hydrogenating component preferably takes place after calcination of the layered silicate. Such component can be impregnated in, or on, the layered silicate such as, for example, by, in the case of platinum, treating the layered silicate with a solution containing a platinum metal-containing ion. Thus, suitable platinum compounds for this purpose include chloroplatinic acid, platinous chloride and various compounds containing the platinum amine complex.

The layered silicate is subjected to thermal treatment, e.g., to decompose organoammonium ions. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience. A rapid calcination of the swollen silicate is preferred to accomplish the delamination of the layered silicate.

Prior to its use in demetallation processes described herein, the layered silicate catalyst is preferably dehydrated, at least partially. This dehydration can be done by heating the crystals to a temperature in the range of from about 200° C. to about 595° C. in an atmosphere such as air, nitrogen, etc., and at atmospheric, subatmospheric or superatmospheric pressures for between about 30 minutes to about 48 hours. Dehydration can also be performed at room temperature merely by placing the layered silicate in a vacuum, but a longer time is required to obtain a sufficient amount of dehydration.

The layered silicate catalyst can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the layered silicate can be extruded before drying or partially dried and then extruded.

It may be desired to incorporate the layered silicate with another material which is resistant to the temperatures and other conditions employed in the catalytic processes described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with layered silicate, i.e., combined therewith or present during its synthesis, which itself is catalytically active may change the conversion and/or selectivity of the catalyst. Inactive materials suitably serve as diluents to control the amount of conversion so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirable to prevent the catalyst from breaking down into powder-like materials. These clay binders have been employed normally only for the purpose of improving the crush strength of the catalyst.

Naturally occurring clays which can be composited with layered silicates include the montmorillonite and kaolin family, which families include the subbentonites, and the kaolins commonly known as Dixie, McNamee, Georgia and Florida clays or others in which the main mineral constituent is halloysite, kaloinite, dickite, nacrite, or anauxite. Such clays can be used in the raw state as originally mined or initially subjected to calcination, acid treatment or chemical modification. Binders useful for compositing with layered silicates also include inorganic oxides, notably alumina.

In addition to the foregoing materials, the layered silicates can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of finely divided layered silicates and inorganic oxide matrix vary widely, with the layered material content ranging from about 1 to about 90 percent by weight and more usually, particularly when the composite is prepared in the form of beads, in the range of about 2 to about 80 weight of the composite.

The demetallation conditions used for demetalizing the petroleum feedstock may include a temperature of 400°–900° F. (204°–482° C.), a pressure of 100–5000 psig, and a weight hourly space velocity of 0.1–10.

EXAMPLE 1

Air-dried as-synthesized kenyaite was combined with a 0.1M cetyltrimethylammonium chloride solution (prepared by mixing 875 milliliters of $H_2O$ with 125 milliliters of a 29% by weight cetyltrimethylammonium chloride solution) in a weight ratio of kenyaite to solution of 1:2. This slurry was allowed to mix overnight. The product was filtered and the procedure was repeated a second time. The product from the second treatment was filtered and washed with water and air-dried. The chemical analyses were:

| | |
|---|---|
| K | 930 ppm |
| $SiO_2$ | 38.6 wt. % |
| Ash, 1000° C. | 38.5 wt. % |

The X-ray pattern of the swollen material showed a major peak at approximately 36 Angstroms, consistent with a swollen layered material whose layers are separated by approximately 18 Angstroms (the layer thickness of kenyaite is approximately 18 Angstroms).

EXAMPLE 2

One hundred grams of the product of Example 1 was combined with 150 grams of water and divided into four equal portions. The first portion (A) was dried in a hot pack (250° F). The second portion (B) was dried in a conventional microwave oven (6 minutes at 95% power). A third portion (C) was dried using a laboratory scale spray drier at a temperature of 150° C. The fourth portion (D) was dried with the spray drier at 200° C. Each sample was then calcined at 540° C. for ten hours in air. The surface areas and average pore sizes of the four calcined materials are shown in Table I. SEM photographs of Example 2C illustrate that the thermal treatment delaminated the layered material providing increased surface area and porosity for catalytic processing. The X-ray pattern of Example 2C showed major peaks at 17.5 and 3.4 Angstroms, which was consistent with the kenyaite structure.

EXAMPLE 3

One hundred grams of the product of Example 1 was combined with 150 grams of ethanol and divided into four equal portions. The first portion (A) was dried in a hot pack (250° F.). The second portion (B) was dried in a conventional microwave oven (5 minutes at 95% power). A third portion (C) was dried using a laboratory scale spray drier at a temperature of 150° C. The fourth portion (D) was dried with the spray drier at 200° C. Each sample was then calcined at 540° C. for ten hours in air. The surface areas and average pore sizes of the four calcined materials are shown in Table I.

EXAMPLE 4

One hundred grams of the product of Example 1 was combined with 150 grams of ethylene glycol and divided into four equal portions. The first portion (A) was dried in a hot pack (250° F.) The second portion (B) was dried in a conventional microwave oven (30 minutes at 90%). A third portion (C) was dried using a laboratory scale spray drier at a temperature of 150° C. The fourth portion (D) was dried with the spray drier at 200° C. Each sample was then calcined at 540° C. for ten hours in air. the surface areas and average pore sizes of the four calcined materials are shown in Table I.

COMPARATIVE EXAMPLE

As-synthesized kenyaite was calcined at 540° C. The surface area was 6.8 m²/g and the average pore size was 153 Angstroms.

TABLE I

| Example | Surface area, m²/g | Average Pore Size, Å |
|---|---|---|
| 2A | 224 | 81 |
| 2B | 195 | 93 |
| 2C | 169 | 75 |
| 2D | 173 | 97 |
| 3A | 222 | 87 |
| 3B | 234 | 89 |
| 3C | 171 | 77 |
| 3D | 180 | 85 |
| 4A | 213 | 91 |
| 4B | 177 | 97 |
| 4C | — | — |
| 4D | 199 | 89 |

Surface areas and Average Pore Size

EXAMPLE 5

Thirty-eight grams of product from Example 1 was blended with 16.5 grams of Ultrasil, a precipitated silica. This blend was impregnated (using a roto-vap) with a solution of 3.32 grams of $(NH_4)_6Mo_7O_{24} \cdot 4H_2O$ dissolved in a 15% (by weight) cetyltrimethylammonium chloride/water solution. The sample was dried at 110° C. overnight and then calcined in air at 540° C. for three hours. This material was then impregnated (using a roto-vap) with a solution of 2.47 grams of $Ni(NO_3)_2 \cdot 6H_2O$ dissolved at 31.86 grams of water. The catalyst was again dried at 110° C. overnight and calcined at 540° C. in air for three hours. The chemical analyses are physical properties were:

| Ni, wt % | 1.55 |
|---|---|
| Mo, wt % | 4.7 |
| Ash, 1000° C. | 98.1 |
| Surface area, m²/g | 143 |

EXAMPLE 6

The product from Example 5 was pelleted, crushed, and sized to 14/24 mesh for evaluation as a demetallation catalyst. After presulfiding, the material was tested in a fixed-bed pilot unit for demetallation of Arabian Light atmospheric reside (Table II) at 0.5 LHSV, 1900 psig $H_2$ pressure, and at 650°, 700°, 725°, and 750° F. The results are summarized in Table II.

TABLE II

Arabian Light Atmospheric Resid

| Gravity, °API | 18.1 |
|---|---|
| Sulfur, wt % | 3.0 |
| Nickel, ppmw | 8.9 |
| Vanadium, ppmw | 34.0 |

| Distillation, wt % | °C. |
|---|---|
| 10 | 320 |
| 30 | 407 |
| 50 | 476 |
| 70 | 558 |

TABLE III

Demetallation Performance

| Temperature, °F. | HDM, % |
|---|---|
| 650 | 50.7 |
| 700 | 65.6 |
| 725 | 72.0 |
| 750 | 81.9 |

What is claimed is:

1. A process for demetalizing a petroleum feedstock, said process comprising contacting said petroleum feedstock with a catalyst under sufficient demetallation conditions, said catalyst comprising at least one hydrogenation metal supported on a non-pillared, delaminated layered silicate lacking octahedrally coordinated sheets of clays.

2. A process according to claim 1, wherein said petroleum feedstock is a resid.

3. A process according to claim 1, wherein said demetallation conditions include a temperature of 400°-900° F., a pressure of 100-5000 psig, and a weight hourly space velocity of 0.1-10.

4. A process according to claim 1, wherein said layered silicate is magadiite or kenyaite.

5. A process according to claim 1, wherein said layered silicate is kenyaite.

6. A process according to claim 5, wherein Ni and Mo are supported on said delaminated layered silicate.

* * * * *